US012514405B2

(12) United States Patent
Wang et al.

(10) Patent No.: US 12,514,405 B2
(45) Date of Patent: Jan. 6, 2026

(54) SELF-CLEANING FOOD PROCESSOR

(71) Applicant: JOYOUNG COMPANY LIMITED, Jinan (CN)

(72) Inventors: Xuning Wang, Jinan (CN); Huaiyu Li, Jinan (CN); Pingping Wang, Jinan (CN)

(73) Assignee: JOYOUNG COMPANY LIMITED, Jinan (CN)

( * ) Notice: Subject to any disclaimer, the term of this patent is extended or adjusted under 35 U.S.C. 154(b) by 316 days.

(21) Appl. No.: 18/549,347

(22) PCT Filed: Mar. 4, 2022

(86) PCT No.: PCT/CN2022/079224
§ 371 (c)(1),
(2) Date: Sep. 6, 2023

(87) PCT Pub. No.: WO2022/188702
PCT Pub. Date: Sep. 15, 2022

(65) Prior Publication Data
US 2024/0148190 A1 May 9, 2024

(30) Foreign Application Priority Data

Mar. 10, 2021 (CN) .......................... 202110260188.3
Mar. 26, 2021 (CN) .......................... 202110330573.0

(51) Int. Cl.
*A47J 43/07* (2006.01)
*A47J 43/046* (2006.01)
(52) U.S. Cl.
CPC ......... *A47J 43/0772* (2013.01); *A47J 43/046* (2013.01); *A47J 43/07* (2013.01);
(Continued)

(58) Field of Classification Search
None
See application file for complete search history.

(56) References Cited

U.S. PATENT DOCUMENTS

| | | | |
|---|---|---|---|
| 2006/0209627 A1* | 9/2006 | McGill | A47J 43/046 366/205 |
| 2016/0296073 A1* | 10/2016 | Pineda | A47J 43/046 |
| 2020/0205613 A1* | 7/2020 | Kolar | A47J 43/046 |

FOREIGN PATENT DOCUMENTS

| | | |
|---|---|---|
| CN | 107752741 A | 3/2018 |
| CN | 109464042 A | 3/2019 |

(Continued)

OTHER PUBLICATIONS

State Intellectual Property Office of the People's Republic of China, International Search Report Issued in Application No. PCT/CN2022/079224, Jun. 1, 2022, 14 pages.

*Primary Examiner* — Jared O Brown
(74) *Attorney, Agent, or Firm* — Kilpatrick Townsend & Stockton LLP

(57) ABSTRACT

A self-cleaning food processor, comprising a main machine, a processing chamber and an electric motor, wherein the processing chamber is internally provided with a crushing blade driven by the electric motor; and the processing chamber comprises an upper cavity, a lower cavity, and a connecting section located between the upper cavity and the lower cavity, the lower cavity being fixedly arranged on the main machine, the upper cavity being detachably arranged relative to the lower cavity, the connecting section being arranged on the upper cavity, and the connecting section at least partially protruding into the processing chamber relative to the lower cavity. The food processor further comprises a cup body assembly which is removable and replaceable with the upper cavity.

15 Claims, 11 Drawing Sheets

(52) U.S. Cl.
CPC ....... *A47J 43/0716* (2013.01); *A47J 43/0727* (2013.01); *A47J 43/0766* (2013.01)

(56) References Cited

FOREIGN PATENT DOCUMENTS

| | | | | | |
|---|---|---|---|---|---|
| CN | 209996090 | U | | 1/2020 | |
| CN | 210124670 | U | * | 3/2020 | ............ A47J 43/046 |
| CN | 211049176 | U | | 7/2020 | |
| CN | 211985141 | U | | 11/2020 | |
| CN | 112168027 | A | * | 1/2021 | ............ A47J 43/046 |
| CN | 112237389 | A | | 1/2021 | |
| CN | 108420334 | B | | 7/2021 | |
| CN | 214964822 | U | | 12/2021 | |
| CN | 214964823 | U | | 12/2021 | |
| CN | 215383416 | U | | 1/2022 | |
| CN | 215383509 | U | | 1/2022 | |
| JP | 3093640 | U | | 5/2003 | |
| WO | WO-2020024894 | A1 | * | 2/2020 | ............ A47J 43/046 |

* cited by examiner

SELF-CLEANING FOOD PROCESSOR

The present application claims the priority of the Chinese Patent Application No. 202110260188.3, titled "SELF-CLEANING FOOD PROCESSOR", filed on Mar. 10, 2021 with the China National Intellectual Property Administration and the priority of the Chinese Patent Application No. 202110330573.0, titled "METHOD FOR SAFELY LOCKING CUP LID OF FOOD PROCESSOR", filed on Mar. 26, 2021 with the China National Intellectual Property Administration, both of which are incorporated herein by reference in their entireties.

FIELD

The present application relates to the field of food processors, and in particular to a self-cleaning food processor which performs self-cleaned thoroughly, has high crushing efficiency and is safe in operation.

BACKGROUND

A conventional food processor generally include a main body and a processing chamber part arranged on the main body, where a motor is arranged inside the main body for driving a crushing blade in the processing chamber part to process ingredients, and the processing chamber part is covered by a cup lid. The patent application with the application number of CN 201711088669.0 discloses a self-cleaning food processor, which includes a container, a lid and a crushing device. An inner side wall of the lid is provided with a nozzle for spraying water towards the lid, so that the lid which is difficult to clean can be fully cleaned through the nozzle, but the sprayed water can only effectively wash the lid, and the cleaning effect on the processing chamber part cannot be optimized, moreover, this solution cannot solve the crushing problem while optimizing the cleaning as a whole. The processing chamber part of the conventional food processor is deep inside, and when the crushing blade drives the water flow to self-clean the processing chamber part, the flushing strength of the water flow becomes smaller as the water flows upper along the inner side wall of the processing chamber part, which makes it difficult to thoroughly clean the upper portion of the processing chamber part, resulting in an unsatisfied cleaning effect. The solution of increasing the speed of the crushing blade for cleaning may easily lead to the problems of greater noise and the overflow of cleaning water from the vent valve on the cup lid, which will also affect the life of the electric motor, and it is still difficult for the cup lid to be cleaned by the water flow. In addition, there is another problem in the conventional food processor. The processing chamber part is required to not only meet the demand of basic milklike liquid yield to improve user's experience, but also meet the performance requirements such as fineness and uniformity of ingredients fully crushed in the processing chamber part. An unsatisfied particle size of the crushed ingredients will be caused and the cleaning problem is worsen with the processing chamber part being too large, while it is difficult to meet both requirements of yield and uniformity of the milklike liquid with the processing chamber part being too small. Therefore, a technical problem to be solved is to improve the crushing efficiency and crushing rate as well as ensure the milklike liquid yield and good uniformity of milklike liquid at the same time of realizing thorough cleaning.

In addition, the conventional self-cleaning food processor with automatic water feeding and milklike liquid making, automatic milklike liquid discharging and cleaning can complete all the working processes without the participation of users. For the self-cleaning food processor with detachable cup body or detachable cup lid, although it is convenient for users because the users do not need to participate in operations such as adding water or cleaning in the fully automatic working process, due to accidental operations of users, such as opening the lid during the working process or abnormal power failure, it is easy to cause unforeseen situations such as program interruption, even failure of making the milklike liquid, or splashing or abnormal discharge of unfinished milklike liquid, or the machine may be frequently started and stopped and thus prolonging the milklike liquid making time. Therefore, a technical problem to be solved is to avoid potential safety hazards caused by user's accidental operations of detaching the cup body or the cup lid, and ensure the smooth implementation of the fully automatic working process of the food processor and the safety of the user when the user's accidental operations occur during the period of fully automatic milklike liquid making and self-cleaning.

SUMMARY

An object of the present application is to provide a food processor with thorough automatic cleaning, high crushing efficiency and uniform milklike liquid with fine taste, and can also ensure that a safety locking mechanism of a cup lid of the food processor can be effectively triggered during the working process of the whole machine to ensure the safety of the user and at the same time ensure the smooth operation of the milklike liquid making and/or automatic cleaning process.

In order to solve the above technical problems, a self-cleaning food processor is provided according to the present application, including a main body, a processing chamber part and an electric motor, where a crushing blade driven by the electric motor is arranged inside the processing chamber part, the processing chamber part includes an upper cavity portion, a lower cavity portion, and a connecting section located between the upper cavity portion and the lower cavity portion, where the lower cavity portion is fixedly arranged at the main body, the upper cavity portion is detachably arranged relative to the lower cavity portion, the connecting section is arranged at the upper cavity portion, and at least part of the connecting section at least partially protrudes toward an interior of the processing chamber part relative to the lower cavity portion.

Further, the connecting section includes an annular seal, which forms a part of an inner side wall of the processing chamber part. An annular bottom lid is arranged at a lower port of the upper cavity portion, and the seal is mounted on the bottom lid.

Further, the inner side wall of the upper cavity portion is arranged to be inclined, and an inner side wall of the connecting section is inclined in the same direction as an inner side wall of the upper cavity portion. Alternatively, an inner side wall of the connecting section is vertically arranged. Alternatively, an inner side wall of the lower cavity portion is arranged to be inclined, and an inner side wall of the connecting section is inclined in the same direction as the inner side wall of the lower cavity portion.

Further, a top end of the crushing blade is arranged to be not higher than the connecting section, which is fixedly arranged at the lower port of the upper cavity portion, and a step is formed at a joint between the connecting section and the lower cavity portion.

Further, an annular support bracket is arranged at the lower port of the upper cavity portion, and the bottom lid is fixedly connected with the support bracket, and the seal is at least partially clamped and fixed between the lower port of the upper cavity portion and the bottom lid.

Further, the seal is provided with an opening and an elastic deformation space in communication with the opening, and an upper port of the lower cavity portion at least partially abuts against the seal to compress the elastic deformation space.

Further, a sum of a volume of the upper cavity portion and a volume of the connecting section is greater than or equal to a volume of the lower cavity portion.

Further, the food processor further includes a cup assembly configured to serve as a substitute for the upper cavity portion. The cup assembly is detachably connected to the main body or the lower cavity portion; the cup assembly includes a cup body and a cup lid, where the cup lid is screwed and mounted to an upper port of the cup body in a screwed manner. The food processor further includes a safety linkage device and a locking linkage device, the cup lid is provided with a lock-up trigger part, which is configured to get into contact with a safety connecting rod of the safety linkage device to drive the safety connecting rod to be pressed down, and keep the safety connecting rod in a pressed-down state after the cup lid is mounted in place. The lock-up trigger part of the cup lid is configured to get into contact with a locking connecting rod of the locking linkage device to drive the locking connecting rod to move downward.

Further, the lock-up trigger part is configured to misalign with the locking connecting rod after the cup lid is mounted in place, so that the locking connecting rod can bounce back upward onto a movement path of the lock-up trigger part through an elastic reset member.

Further, the locking linkage device further includes a locking trigger, which is configured to abut against the locking connecting rod and enable the locking connecting rod to lock the cup lid at the upper port of the cup body, so as to prevent the cup lid form being detached.

Further, the locking linkage device further includes a locking switch, when the cup body is mounted to the main body or the lower cavity portion, the locking trigger is configured to drive the locking trigger to move upward and abut against a lower end of the locking connecting rod, to keep the locking connecting rod in a state that the locking connecting rod is at least partially protrude on a movement path of the lock-up trigger part.

Further, the safety linkage device includes a safety switch, and when the cup assembly is mounted to the main body, the safety connecting rod which is kept in the pressed-down state is used to trigger the safety switch to be in conduction.

Further, the locking connecting rod includes a first locking connecting rod and a second locking connecting rod, and an elastic reset member is arranged between the first locking connecting rod and the second locking connecting rod. The lock-up trigger part is configured to get into contact with the first locking connecting rod and drive the first locking connecting rod to move downward. The locking trigger is configured to drive the first locking connecting rod and the second locking connecting rod to move upward, to make the first locking connecting rod at least partially protrude on a movement path of the lock-up trigger part of the cup lid.

Further, the safety linkage device further includes a safety switch trigger, and when the cup assembly is mounted on the main body or the lower cavity portion, the safety connecting rod which is kept in the pressed-down state is used to press down the safety switch trigger, to trigger the safety switch to be in conduction.

The beneficial effects of the present application are as follows.

The connecting section is provided between the upper cavity portion and the lower cavity portion, and the upper cavity portion is detachably connected to the lower cavity portion through the connecting section, in addition, the joint between the upper cavity portion and the lower cavity portion is sealed by the connecting section, and the connecting section is transitionally connected with the upper cavity portion. At least part of the connecting section is arranged to protrude into the processing chamber part relative to the lower cavity portion, to guide the cleaning water flow to change its direction at the connecting section which is arranged to protrude inward with respect to the lower cavity portion. The water flow, driven by the crushing blade to run upward along a side wall of the lower cavity portion, inclines at the connecting section to a direction towards a rotation center of the crushing blade along the protruding connecting section, and keeps running upward under the stirring of the crushing blade, thus increasing the stroke of the water flow running upward to wash the upper cavity portion and the strength of washing a top wall of the upper cavity portion, so as to automatically clean the upper cavity portion in 360 degrees without leaving any dead areas. In the process of crushing and liquid making, with the connecting section at least partially protruding into the processing chamber part, the ingredients thrown to the side wall of the lower cavity portion by the crushing blade under the action of centrifugal force can be effectively pressed downward and toward the crushing blade, and the solid ingredients in the solid-liquid mixture can be gathered in the lower cavity portion to be further crushed, and at the same time, a thick liquid with small volume can be pressed to accumulate in the lower cavity portion, so as to be fully stirred and cooked. For the milklike liquid made with water being added, with the upper cavity portion, the capacity of the food processor is increased based on the volume of the lower cavity portion, so as to achieve crushing in small space and large liquid making capacity, and at the same time make the milklike liquid fine and uniform. Especially when making low-concentration milklike liquid and fruit and vegetable juice, the connecting section which is arranged in a protruding manner can assist the crushing blade to further process the crushed particles of hard ingredients such as carrots, and thus the graininess of the produced fruit and vegetable juice will be further reduced. During the process of screwing on the cup lid of the food processor, the lock-up trigger part of the cup lid acts on the safety connecting rod and the locking connecting rod respectively, and after the cup lid is mounted in place, the safety switch is in conduction, and at the same time, it is ensured that the cup lid can satisfy the condition of being locked by the locking linkage device. The installation of the cup lid can realize both the conduction of the safety switch and the trigger of the locking of the cup lid, and the structure is simple and the operation is smooth.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION OF THE EMBODIMENTS

Figure 1:
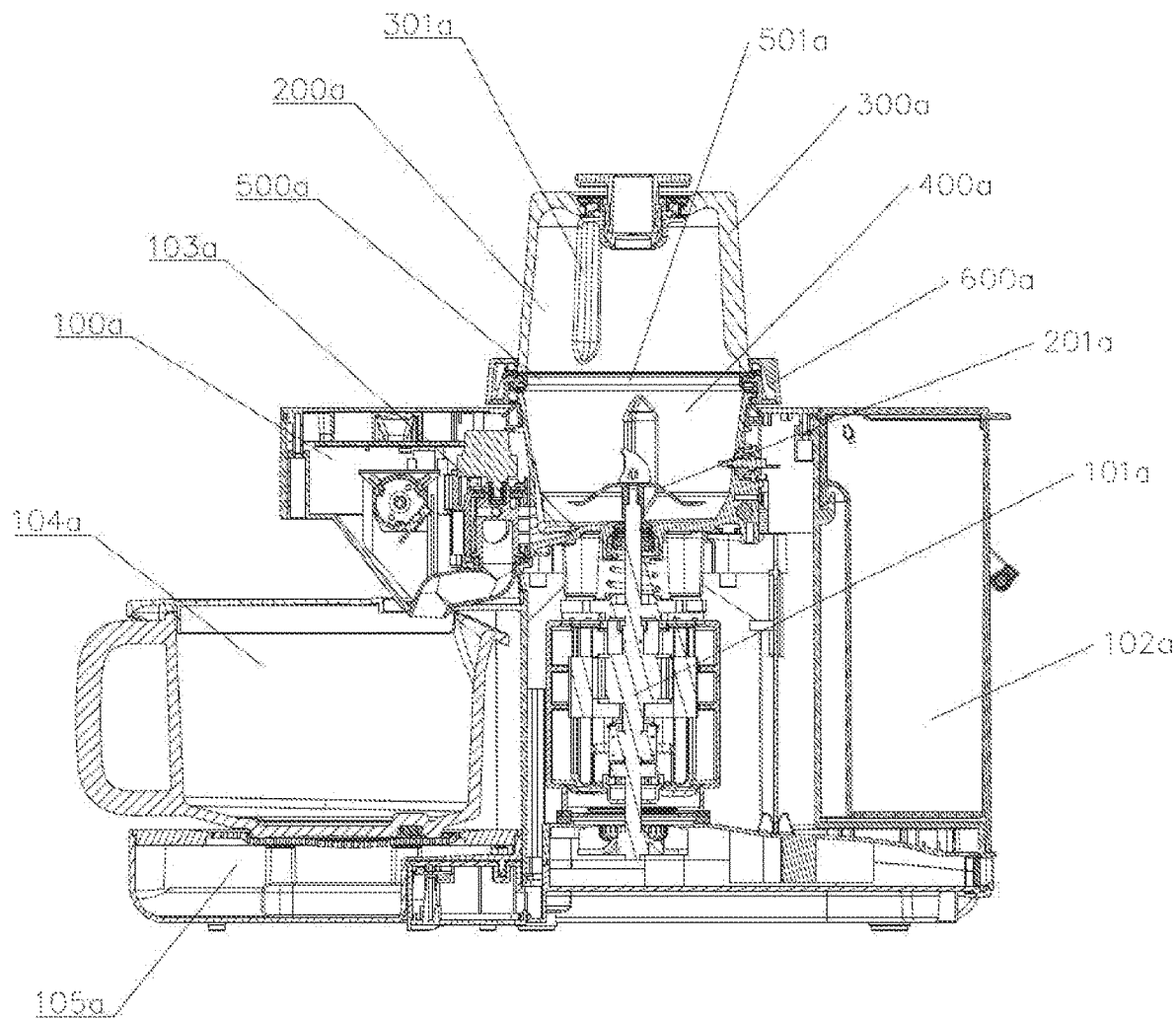
FIG. 1 is a schematic view showing the structure of a whole machine of a food processor according to an embodiment of the present application.
Figure 2:
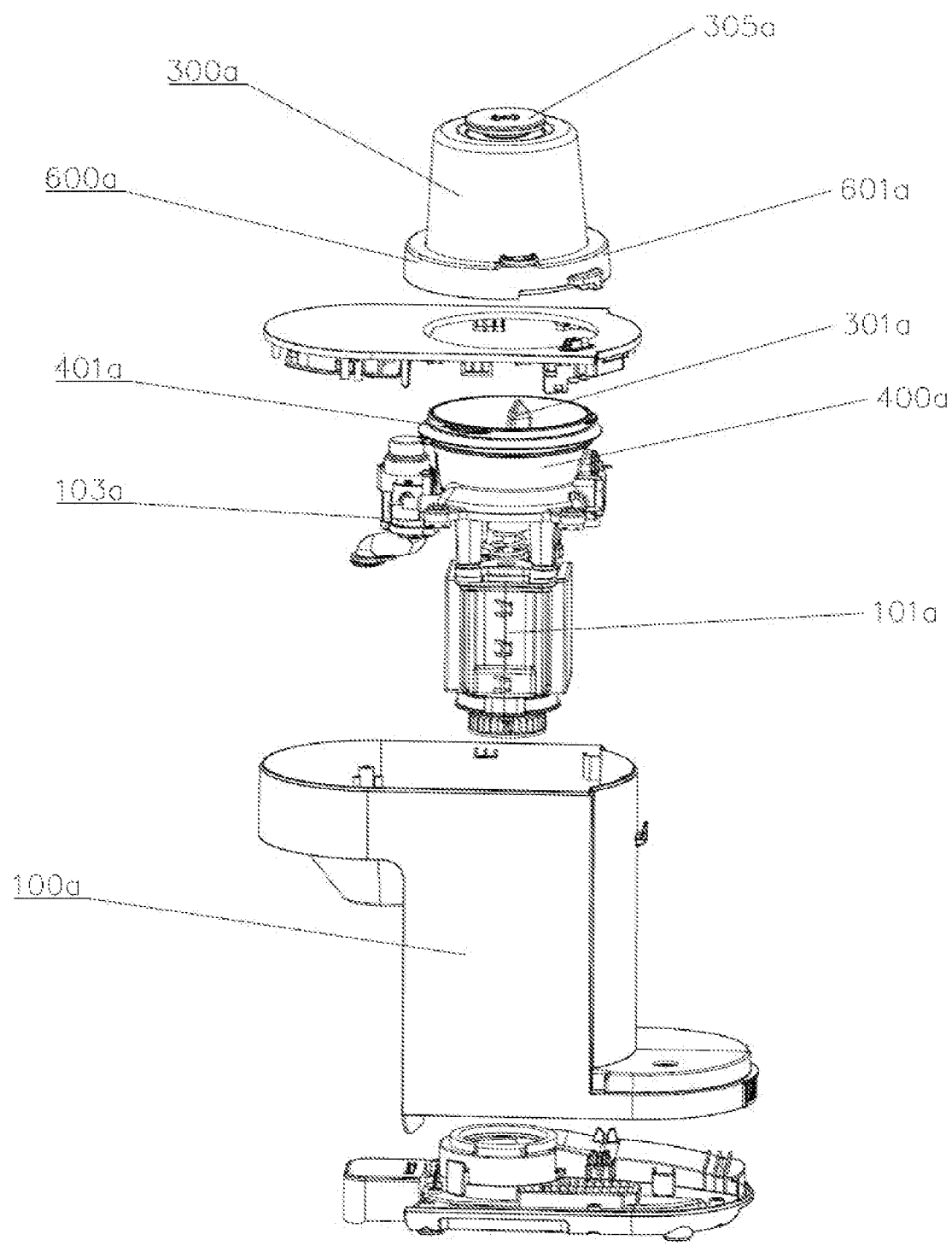
FIG. 2 is an exploded view of the food processor according to the embodiment of the application.

Technical solutions according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of protection of the present application.

First Embodiment

As shown in FIG. 1 to FIG. 8, a self-cleaning food processor is provided according to the present application, including a main body 100a, a processing chamber part 200a and an electric motor 101a, where a crushing blade 201a driven by the electric motor is arranged inside the processing chamber part. The main body is provided with a water tank 102a, which is in communication with the processing chamber part through a pipeline. In this embodiment, the electric motor is arranged inside the main body, the processing chamber part includes an upper cavity portion 300a, a lower cavity portion 400a, and a connecting section 500a between the upper cavity portion and the lower cavity portion. The lower cavity portion 400a is fixedly arranged at the main body, and is arranged to be at least partially sunk relative to a top of the main body. The upper cavity portion is detachably arranged relative to the lower cavity portion, and the upper cavity portion 300a is mounted at an upper port of the lower cavity portion in an upside-down manner. The connecting section 500a is arranged at the upper cavity portion 400a, and the connecting section 500a is arranged to at least partially protrude into the processing chamber part relative to the lower cavity portion. Specifically, the connecting section 500a may be fixedly arranged at a lower port of the upper cavity portion 400a. The connection section 500a seals a joint between the upper cavity portion and lower cavity portion, and guides the cleaning water flow to change its direction at the connecting section which is arranged in a protruding manner. The water flow, driven by the crushing blade 201a to run upward along a side wall of the lower cavity portion, inclines at the connecting section to a direction towards a rotation center of the crushing blade along the protruding connecting section, and keeps running upward under the stirring of the crushing blade, thus increasing the stroke of the water flow running upward to wash the upper cavity portion and the strength of washing a top wall of the upper cavity portion, so as to automatically clean the upper cavity portion in 360 degrees without leaving any dead areas. The lower cavity portion 400a is provided with a milklike liquid outlet and a valve assembly 103a connected to the milklike liquid outlet. The valve assembly is in communication with the water tank 102a through a water inlet pipeline, and the water in the water tank enters the valve assembly through the water inlet pipeline and enters into the processing chamber part through the milklike liquid outlet. After milklike liquid making is completed, the milklike liquid is discharged to a milklike liquid receiving jug 104a through the valve assembly, and the wastewater after cleaning is discharged into a residual water box 105a.

In the process of crushing and liquid making, with the connecting section at least partially protruding into the processing chamber part, the ingredients thrown to the side wall of the lower cavity portion by the crushing blade under the action of centrifugal force can be effectively pressed downward and toward the crushing blade, and the solid ingredients in the solid-liquid mixture can be gathered in the lower cavity portion to be further crushed, and at the same time, a thick liquid with small volume can be pressed to accumulate in the lower cavity portion, so as to be fully stirred and cooked. For the milklike liquid made with water being added into the thick liquid, with the upper cavity portion, the liquid making capacity of the food processor is increased based on the volume of the lower cavity portion, so as to achieve crushing in small space and large liquid making capacity, and at the same time make the milklike liquid fine and uniform. Especially when making low-concentration milklike liquid and fruit and vegetable juice, the connecting section which is arranged in a protruding manner can assist to further process the crushed particles of hard ingredients such as carrots, and thus the graininess of the produced fruit and vegetable juice can be further reduced.

Figure 3:
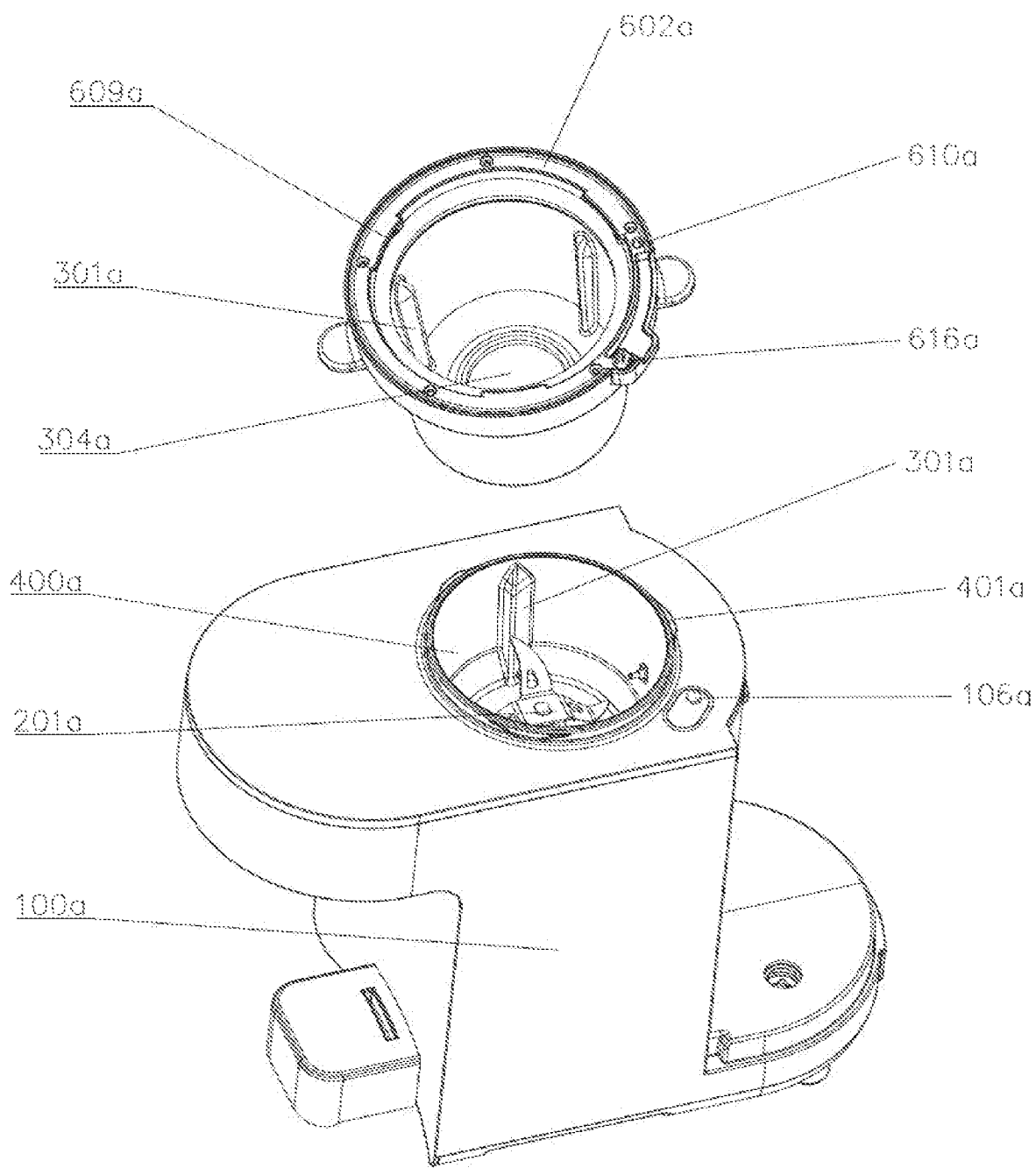
FIG. 3 is a schematic view showing a processing chamber part of the food processor is mounted according to the embodiment of the present application.
Figure 4:
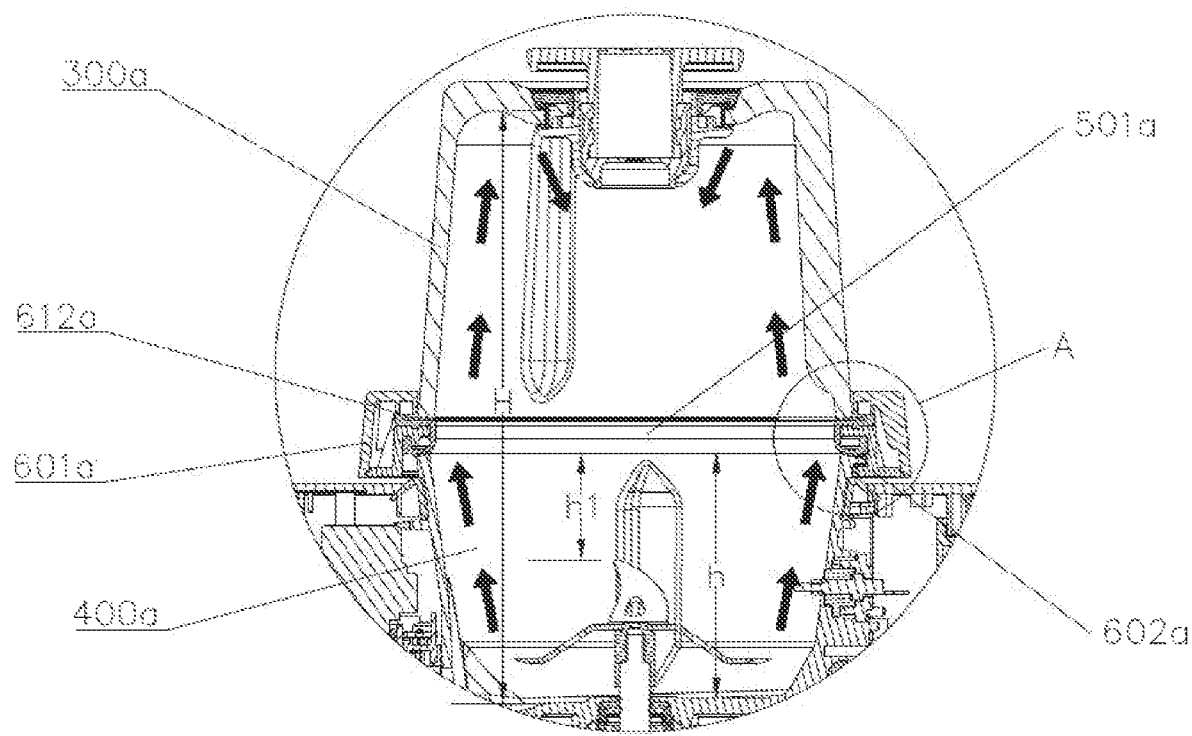
FIG. 4 is a schematic view showing a cleaning cycle in the processing chamber part of the food processor according to the embodiment of the present application.

As shown in FIG. 3 and FIG. 4, the connecting section 500a includes an annular seal 501a, which forms a part of an inner side wall of the processing chamber part, so as to cooperate with the crushing blade to participate in actions such as crushing, liquid making, and automatic cleaning. The annular seal 501a circumferentially protrudes from the inner side wall of the lower cavity portion in a surrounded manner. In this embodiment, the inner side wall of the upper cavity portion 300a and the inner side wall of the lower cavity portion 400a each is provided with a spoiler rib 301a, and the connecting section cooperates with the spoiler ribs in the processing chamber part 200a, so as to prevent the downward falling trend of the spoiled water flow or milklike liquid, thereby balancing the amount of the milklike liquid in the upper cavity portion 300a and the lower cavity portion 400a during liquid making and the water distribution in the upper cavity portion 300a and the lower cavity portion 400a during cleaning, making the milklike liquid uniform and the cleaning water flow fully spoiled, thereby further increasing the cleaning strength of the inner wall of the processing chamber part.

The inclined direction of the connecting section 500a can be set according to needs of compensation for product characteristics. Specifically, the inclined direction of the connecting section 500a may be consistent with that of the upper cavity portion, which is more conducive to flow guiding and cleaning of the upper cavity portion; alternatively, the connecting section 500a may be vertically arranged, to optimize the sealing performance between the upper cavity portion and the lower cavity portion, especially at the position where the upper cavity portion and lower cavity portion may be detached, that is, an upper end or a lower end of the connecting section, so as to further ensure no milklike liquid leakage; alternatively, the inclined direction of the connecting section 500a may be consistent with that of the lower cavity portion, the circulation speed and circulation effect of the water flow in the upper cavity portion 300a and the lower cavity portion 400a can be further optimized, because the strength of the water flow pressing downward on the blade is increased, a better cleaning effect on a middle part of an upper surface of the crushing blade 201a is realized. In this embodiment, the inner side wall of the upper cavity portion 300a is inclined, and the inner side wall of the lower cavity portion 400a is inclined with an inclined direction opposite to that of the inner side wall of the upper cavity portion. The inner diameter of the upper cavity portion is reduced along an upward direction, so that the inner diameter of the processing chamber part is the largest at the connecting section. The inclined direction of the inner side wall of the connecting section is consistent with that of the inner side wall of the upper cavity portion, so the inner diameter of the connecting section 500a is at least partially reduced from bottom to top.

A top end of the crushing blade 201a is arranged to be not higher than the connecting section 500a, the connecting section 500a is fixedly arranged at the lower port of the upper cavity portion, and a step is formed at the joint between the connecting section 500a and the upper end of the side wall of the lower cavity portion 400a, so that the water flow can be effectively guided to effectively press the ingredients. The volume of the lower cavity portion 400a is smaller than or equal to a sum of the volume of the upper cavity portion 300a and the volume of the connecting section. The connecting section is arranged at a specific height of the processing chamber part, the distance between the connecting section 500a and a bottom wall of the lower cavity portion is smaller than or equal to the distance between the connecting section and a top wall of the upper cavity portion, and the top end of the crushing blade 201a is arranged to be flush with or lower than the connecting section. Based on this, in the rated liquid making or cleaning process, when the liquid level in the calm state does not exceed the connecting section 500a, stirring of the crushing blade can increase the washing strength of the cleaning water on the connecting section. In this embodiment, as shown in FIG. 4, a height between the connecting section 500a and the bottom wall of the processing chamber part 200a is represented as "h", a height of an inner cavity of the processing chamber part 200a is represented as "H", where $1/5 \leq h/H \leq 4/5$, and a distance between the connecting section 500a and the top end of the crushing blade 201a is represented as "h1", where $1/5 \leq h1/h \leq 4/5$. Preferably, 10 mm≤h1≤100 mm. In this embodiment, "h" is 64 mm, "H" is 157 mm, and "h1" is 45 mm. With such arrangement, the balance between advantages of the cleaning and crushing of the connecting section can be used to a greatest extent, and thus both the cleaning and crushing performance of the food processor can be effectively improved. It is ensured that the cleaning water flow can be effectively guided by the connecting section, the water flow driven by the crushing blade will first get in touch with the inner side wall of the lower cavity portion and move upwards to trigger the guiding of the connecting section 500a, otherwise the water flow will directly cross the connecting section and reach the upper cavity portion, and the cleaning strength for the side wall and the top wall of the upper cavity portion cannot be ensured in this case. In addition, it is also necessary to ensure that the lower cavity portion 400a has sufficient space for accommodating solid ingredients in a case that the upper cavity portion is detached by the user, and ensure that the depth of the whole processing chamber part, after the upper cavity portion 300a is stacked on the lower cavity portion 400a, meets the requirements of fine crushing and thorough cleaning.

Figure 5:
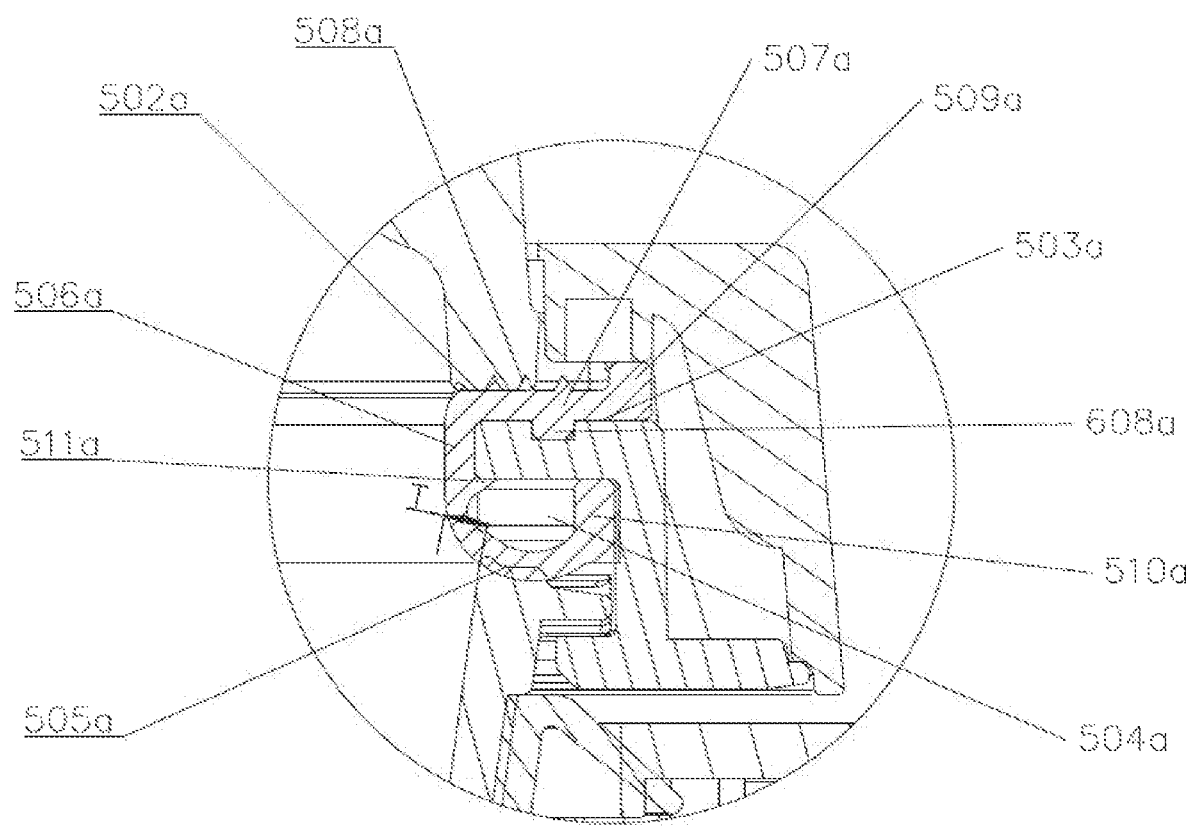
FIG. 5 is a partially enlarged view of a portion A in FIG. 4.

As shown in FIG. 5, the seal 501a is provided with a guide part 505a, which guides the water flow stirred by the crushing blade to flow obliquely upward to clean the upper cavity portion 300a. The guide part 505a at least partially protrudes toward the interior of the processing chamber part. The guide part 505a includes an obliquely arranged guide surface, the inclined direction of which is the same as that of the upper cavity portion 300a. A step is formed between the connecting section 500a and the upper end of the side wall of the lower cavity portion 400a, and the guide surface is the stepped surface of the step. The guide part extends upward to form an extension part 506a, and an angle between the guide part 505a and a vertical surface is greater than an angle between the extension part 506a and the vertical surface, and the at least part of the guide part and/or the extension part forms a part of the inner side wall of the processing chamber part. In this embodiment, the extension part 506a and the guide part 505a together form a part of the inner side wall of the processing chamber part 200a, and the extension part 506a can further extend the upward movement trend of the water flow changed by the guide part, while correct the deviation of the inclined direction of the water flow caused by the high-speed rotation and intermittent pause or reversing of the crushing blade, to help the water flow reach the top wall of the upper cavity portion 300a more quickly, so as to strongly flush the upper cavity portion, to avoid the attachment of stubborn residual milklike liquid or ingredient particles. The seal 501a further includes a sealing end part 507a, and the extension part is laterally bent and extends outward to form the sealing end part, and the sealing end part 507a is hermetically abuts against the lower port of the upper cavity portion 300a. In this embodiment, the sealing end part is a sealing end surface 502a, and multiple annular sealing ribs 508a are arranged on the sealing end surface, and the sealing end part is hermetically fitted with the lower port of the upper cavity portion. In this embodiment, after the upper cavity portion is installed in place, the upper port of the lower cavity portion abuts against a part of the guide part, and a distance between the inner side wall of the lower cavity portion and the guide part protruding toward the interior of the processing chamber part is represented as "T", where 1 mm≤T≤5 mm, and preferably "T" is 2 mm. With such arrangement, the guiding of the connecting section to the cleaning water flow can be optimized, and at the same time, the pressing of the connecting section to the ingredients during crushing and liquid making can be effectively ensured, so that the ingredients are accumulated in the lower cavity portion to be crushed, and thus the cleaning performance and crushing performance can be best balanced.

The seal is provided with an opening 503a and an elastic deformation space 504a in communication with the opening. The upper port of the lower cavity portion 400a at least partially abuts against the seal 501a to compress the elastic deformation space 504a, which can effectively eliminate the problems of poor sealing performance caused by uneven hardness of the seal, the manufacturing tolerance of the upper cavity portion and the assembly tolerance between the upper cavity portion and the lower cavity portion. In addition, user's hand feeling during installation can be greatly improved by providing the elastic deformation space, and the frictional resistance between the seal and the upper port of the lower cavity portion during installation can be reduced through the deformation of the elastic deformation space. Specifically, the elastic deformation space 504a having the annular opening is defined by the guide part 505a, the extension part 506a and the sealing end part 507a together, and the opening is located at a periphery of the seal. The seal further includes a first limiting rib 509a arranged at the sealing end part and a second limiting rib 510a arranged at the guide part. Specifically, the first limiting rib 509a is a limiting protrusion formed by upward extension from an end, proximate to the opening, of the sealing end part, and the second limiting rib 510a is a limiting protrusion formed by upward extension from an end, proximate to the opening, of the guide part, so as to ensure that the seal will not move up and down and the local sealing will not fail, thus ensuring the balance of compression between the seal and the upper cavity portion and compression between the seal and the lower cavity portion, to avoid the liquid leakage caused by uneven pressure above and under the seal due to uneven compression above and under the seal. A third limiting rib 511a is arranged in the elastic deformation space, and the elastic deformation space includes an installation space located above the third limiting rib 511a and a deformation space located below the third limiting rib to avoid the insufficient margin of the elastic deformation space caused by installation displacement, thereby further ensuring the sealing performance.

Figure 7:
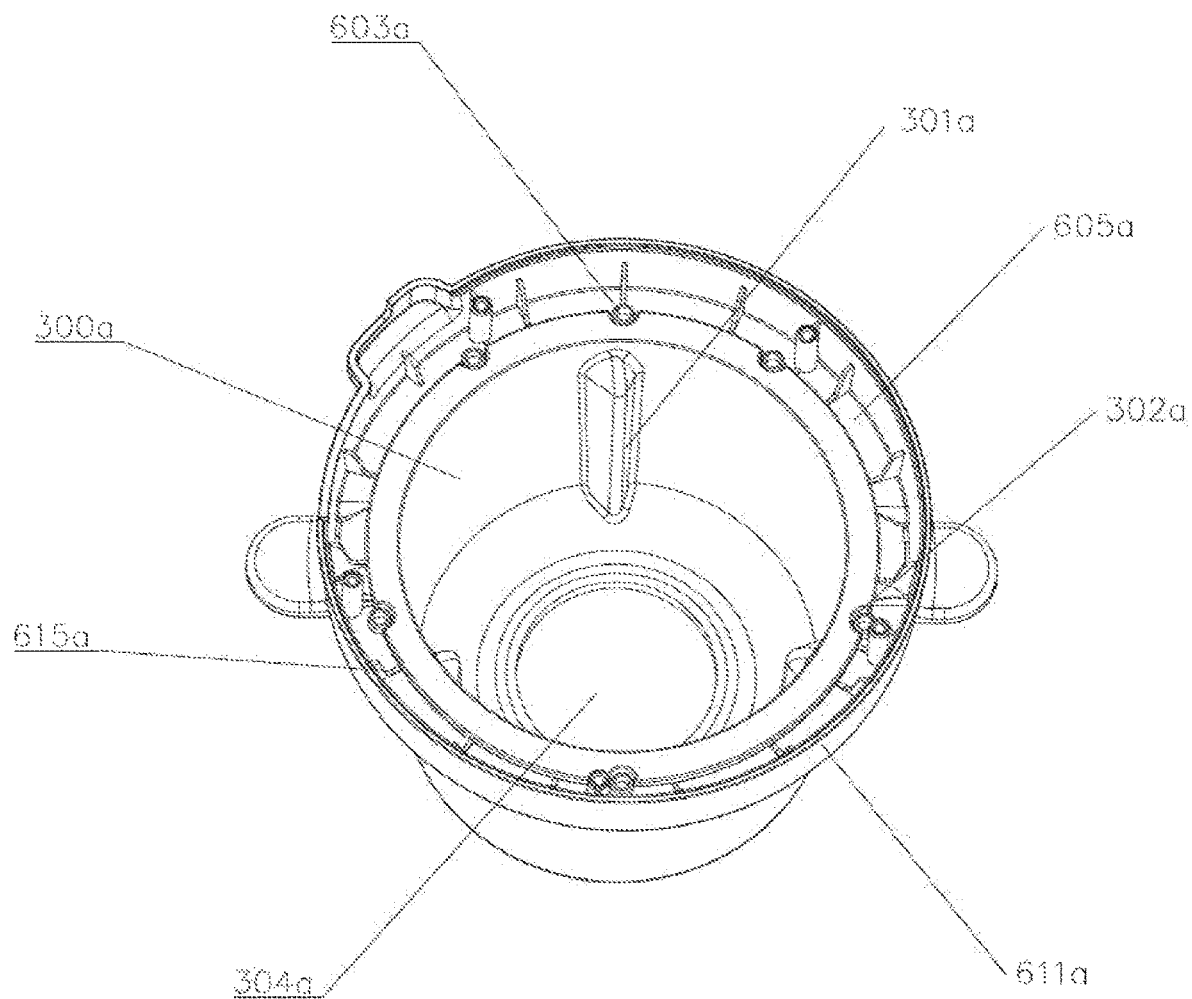
FIG. 7 is a schematic view showing the upper cavity portion matching a support bracket of the food processor according to the embodiment of the present application.

The processing chamber part includes a seal fixing device 600a arranged at the lower port of the upper cavity portion, and the seal fixing device at least partially extends into the opening 503a to clamp and fix the seal at the lower port of the upper cavity portion through the sealing end part. The seal is at least partially exposed in the processing chamber part to guide away the milklike liquid and effectively prevents the ingredient residue or milklike liquid from entering the sealing end surface. In this embodiment, the seal fixing device includes a support bracket 601a and a bottom lid 602a arranged below the support bracket. Specifically, the lower port of the upper cavity portion is provided with an annular bottom lid 602a, and the bottom lid 602a is provided with an installation flange 604a, and the seal is sleeved on the installation flange through the annular opening. The lower port of the upper cavity portion 300a is provided with the annular support bracket, the support bracket 601a is located above the bottom lid, the support bracket is provided with a screw post, and the bottom lid is provided with a screw hole, so that the bottom lid 602a can be fixedly connected with the support bracket 601a through the screw, and thus the seal can be at least partially clamped and fixed between the lower port of the upper cavity portion and the bottom lid. The seal can be detached together with the upper cavity portion, so as to avoid the accumulation of residual ingredients at the upper port when the ingredients being put into the lower cavity portion, which may affect the flatness of the sealing surface of the seal when the upper cavity portion and lower cavity portion are installed, and thereby avoiding water leakage caused by user's accidental operations. The support bracket 601a is arranged around the periphery of the lower end of the upper cavity portion. As shown in FIG. 7, the support bracket is provided with a positioning structure 603a, and the upper cavity portion is provided with a limiting structure 302a fitted with the positioning structure. In this embodiment, the positioning structure 603a is embodied as multiple protruding rods, and the limiting structure 302a is embodied as positioning notches circumferentially arranged at the outer edge of the lower end of the upper cavity portion and fitted with the positioning rods in one-to-one correspondence, so as to prevent the support bracket from rotating circumferentially relative to the upper cavity portion. During the production and assembly of the food processor, the seal is firstly sleeved and fixed on the bottom lid 602a, and the support bracket is sleeved and installed at the lower end of the upper cavity portion. The seal is installed at the lower port of the upper cavity portion along with the bottom lid and is fixedly connected with the support bracket, to avoid sealing failure caused by movement of the seal. Moreover, the seal is easy to install, which simplifies the installation action of users and avoids milklike liquid leakage caused by installation errors. In addition, the installation of the seal 501a also simplifies the limiting structure between the upper cavity portion and the support bracket, and thus avoids hiding ingredients or forming dead areas of cleaning.

Specifically, the support bracket includes an annular side wall 611a and an upper flange 605a arranged at an upper end of the annular side wall. A bottom edge of the upper flange is provided with an annular positioning boss 612a protruding downward, and the lower end of the upper cavity portion is provided with a limiting step 303a. In this embodiment, the limiting step 303a is a flange provided at the lower port of the upper cavity portion, and the positioning notches are provided on the limiting step 303a. The positioning boss on the upper flange 605a matches the limiting step to axially limit the support bracket, and there is a gap provided between the upper flange 605a and the outer side wall of the upper cavity portion, so as to avoid over-positioning and scratching the outer wall of the upper cavity portion. The bottom lid includes a bottom lid side wall 613a, the installation flange 604a provided at the upper end of the bottom lid side wall, and a lower flange 606a arranged at the lower end of the bottom lid side wall, and the bottom lid abuts against and fitted with the lower end of the support bracket 601a through the lower flange 606a. Specifically, an inner side of the lower end of the annular side wall 611a of the support bracket is provided with an upper positioning surface, and the lower flange 606a of the bottom lid is provided with a lower positioning surface, and the upper positioning surface abuts against and fitted with the lower positioning surface, so that the seal 501a is locked and fixed between the top surface of the installation flange of the bottom lid and the end surface of the lower port of the upper cavity portion while the bottom lid and the support bracket are locked and fixed by screw.

Figure 8:
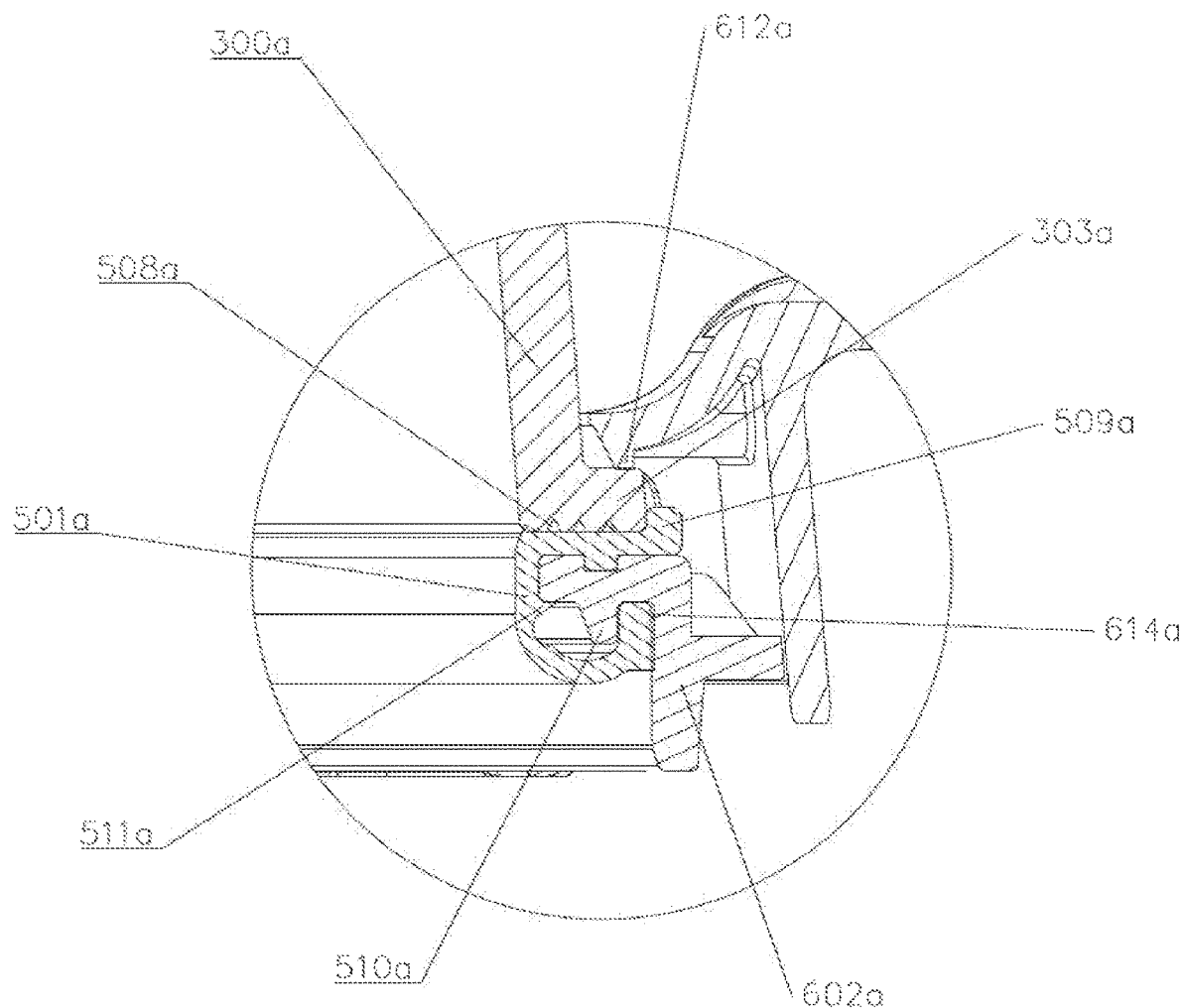
FIG. 8 is a partial cross-sectional view of the processing chamber part of the food processor according to the embodiment of the present application.

Atop of the installation flange is provided with an annular limiting groove 607a, and a bottom surface of the sealing end part of the seal is provided with an annular limiting protruding rib 608a which is fitted with the limiting groove. When the seal 501a is sleeved on the bottom lid through the opening 503a, the limiting protruding rib 608a is clamped into the limiting groove to limit the seal. As shown in FIG. 8, the first limiting rib 509a, which is fitted with an outer periphery of the limiting step at the lower end of the upper cavity portion, is provided at an upper end of the opening, and the second limiting rib 510a which is fitted with the bottom lid is provided at a lower end of the opening. A bottom surface of the installation flange of the bottom lid is provided with an arc-shaped boss, and a clamping groove 614a is formed between the arc-shaped boss and the side wall of the bottom lid, and the second limiting rib 510a is clamped into the clamping groove 614a to limit the guide part of the seal. When the upper cavity portion is mounted on the lower cavity portion, the guide part abuts against the upper port of the lower cavity portion.

Figure 6:
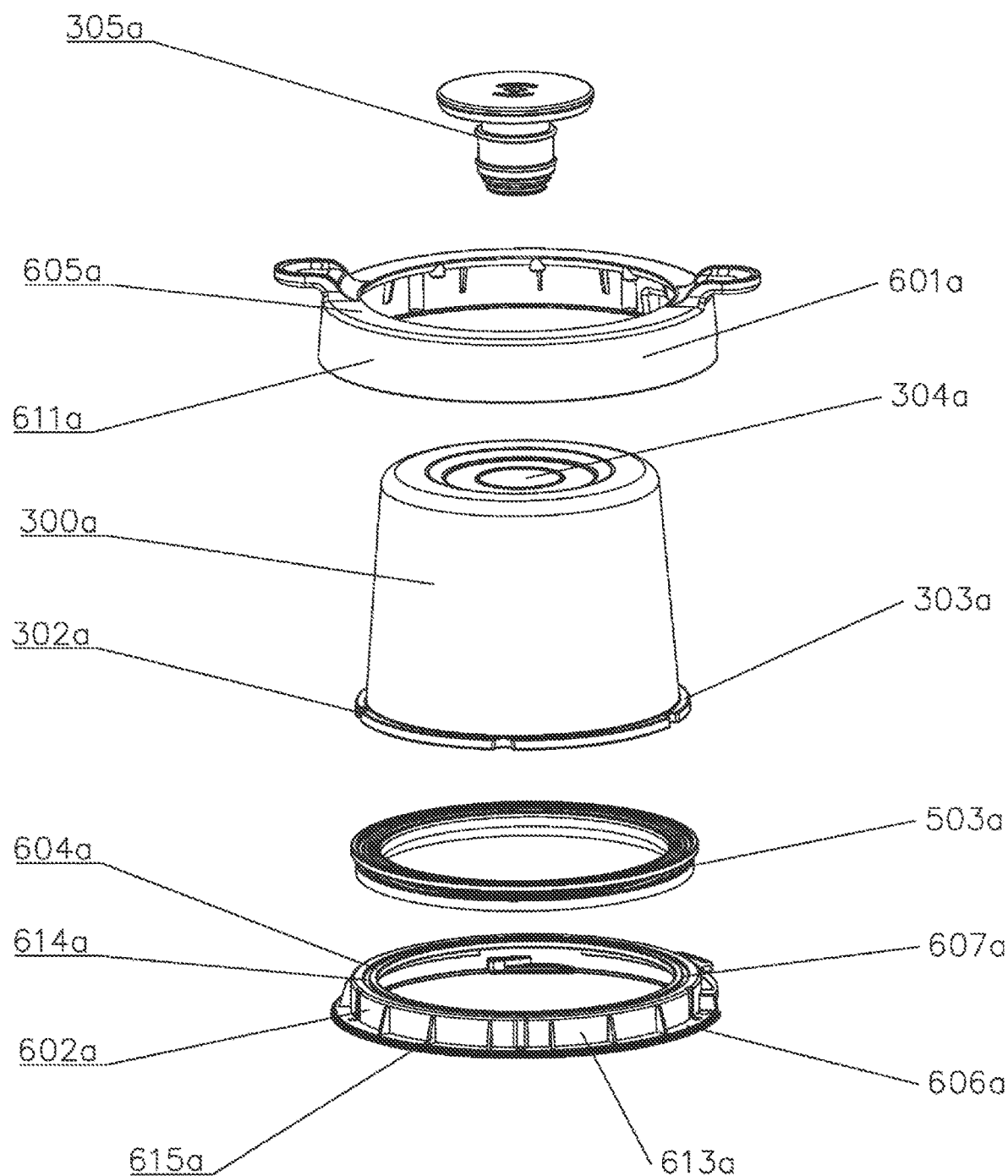
FIG. 6 is an exploded view of an upper cavity portion of the food processor according to the embodiment of the present application.

The seal fixing device is provided with an upper screwing structure 401a, and the upper port of the lower cavity portion is provided with a lower screwing structure 609a which is fitted with the upper screwing structure. The upper cavity portion and the lower cavity portion are screwedly connected, so that the joint between the upper cavity portion and the lower cavity portion can be sealed by the seal. In this embodiment, as shown in FIG. 6, the upper screwing structure is provided at an inner side of the side wall of the bottom lid, and the lower screwing structure 609a is provided at an outer side of an upper end of the side wall of the lower cavity portion. The lower cavity portion is made of aluminum by die-casting, and a heating tube is embedded in the lower cavity portion. The upper cavity portion is made of glass, and the side wall and the top wall are connected into a whole. The top wall is provided with a feeding port 304a and a vent plug 305a, and a sealing member is arranged between the feeding port and the vent plug, so that the visual effects of processing and cleaning are good. When the upper screwing structure is screwed into the lower screwing structure 609a, the upper port of the lower cavity portion abuts against the guide part of the seal and compresses the elastic deformation space, so that the joint between the upper cavity portion and lower cavity portion can be reliably sealed, and the assembly accuracy error caused by the manufacturing tolerance of the upper cavity portion can be offset at the same time. The support bracket 601a and the bottom lid 602a each is provided with a reinforcing rib 615a, which is longitudinally arranged. The reinforcing rib on the support bracket extends upward from the inner side of the annular side wall of the support bracket to the bottom surface of the upper flange and is flush with the positioning boss, and the reinforcing rib on the bottom lid extend downward from the outer side of the side wall of the bottom lid to the top surface of the lower flange. The upper screwing structure is a turnbuckle, and the lower screwing structure is a snap-fit buckle, and the upper surface of the snap-fit buckle is lower than the end surface of the upper port of the lower cavity portion, so that the function of screwing the turnbuckle and the function of sealing the end surface of the upper port of the lower cavity portion are independent and reliable without interference. The main body is provided with a locking device 106a to lock the upper cavity portion, and the bottom lid is provided with a locking structure 616a fitted with the locking device. After the upper cavity portion is screwed and installed in place, the locking structure 616a is fitted with the locking device 106a to prevent the upper cavity portion from being accidentally disassembled after being powered-on.

In this embodiment, the lower flange of the bottom lid 602a is provided with a water release hole 610a, which prevents liquid from entering between the support bracket and the bottom lid due to the height difference of the upper cavity portion in manufacture, and the residual water can be discharged through the water release hole 610a in time, so as to avoid unpleasant smell caused by the retention of the residual water in the seal fixing device. During use, if the upper cavity portion is accidentally sprayed with water after being detached by the user, the residual water can also be discharged through the water release hole in time to ensure the cleanliness of the accessories and the safety of the user.

It can be understood that the inner side wall of the connecting section may be vertically arranged. Alternatively, the inner side wall of the lower cavity portion is inclined, and the inclined direction of the inner side wall of the connecting section is the same as that of the inner side wall of the lower cavity portion.

It can be understood that water release hole may also be arranged on the support bracket.

It can be understood that the seal fixing device may have different structures. For example, the seal fixing device includes a support bracket but does not include a bottom lid, where the support bracket is screwed on the upper cavity portion, and the seal can be clamped and fixed between the support bracket and the lower port of the upper cavity portion. The lower end of the support bracket is further provided with an upper screwing structure, which is connected with the lower screwing structure of the lower cavity portion. In this case, the structure is simplified and the number of the accessories is decreased, and the installation and manufacturing costs can be reduced.

Second Embodiment

Figure 9:
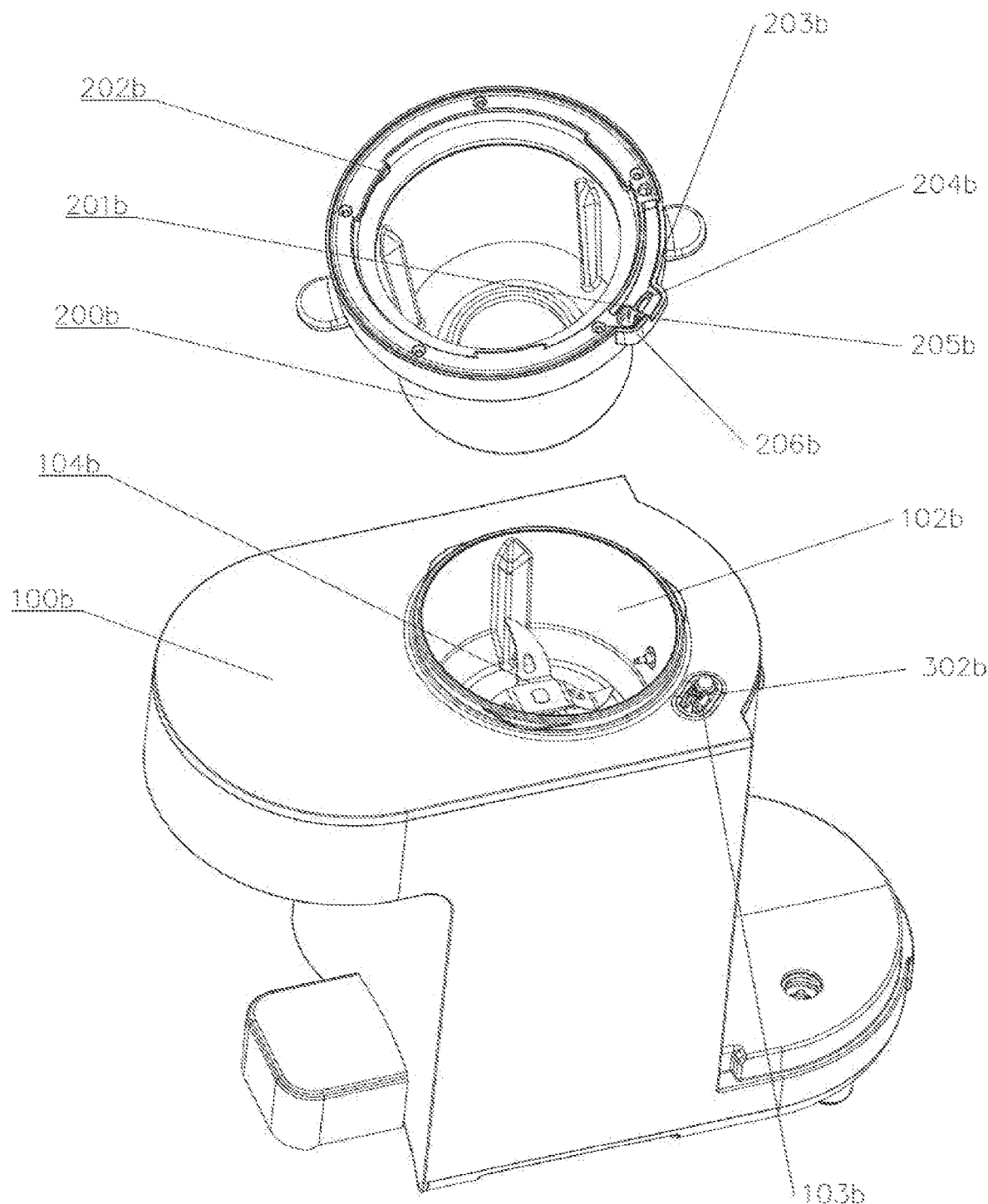
FIG. 9 is a schematic structural view of a detachable processing chamber part and a main body of a food processor according to another embodiment of the present application.
Figure 10:
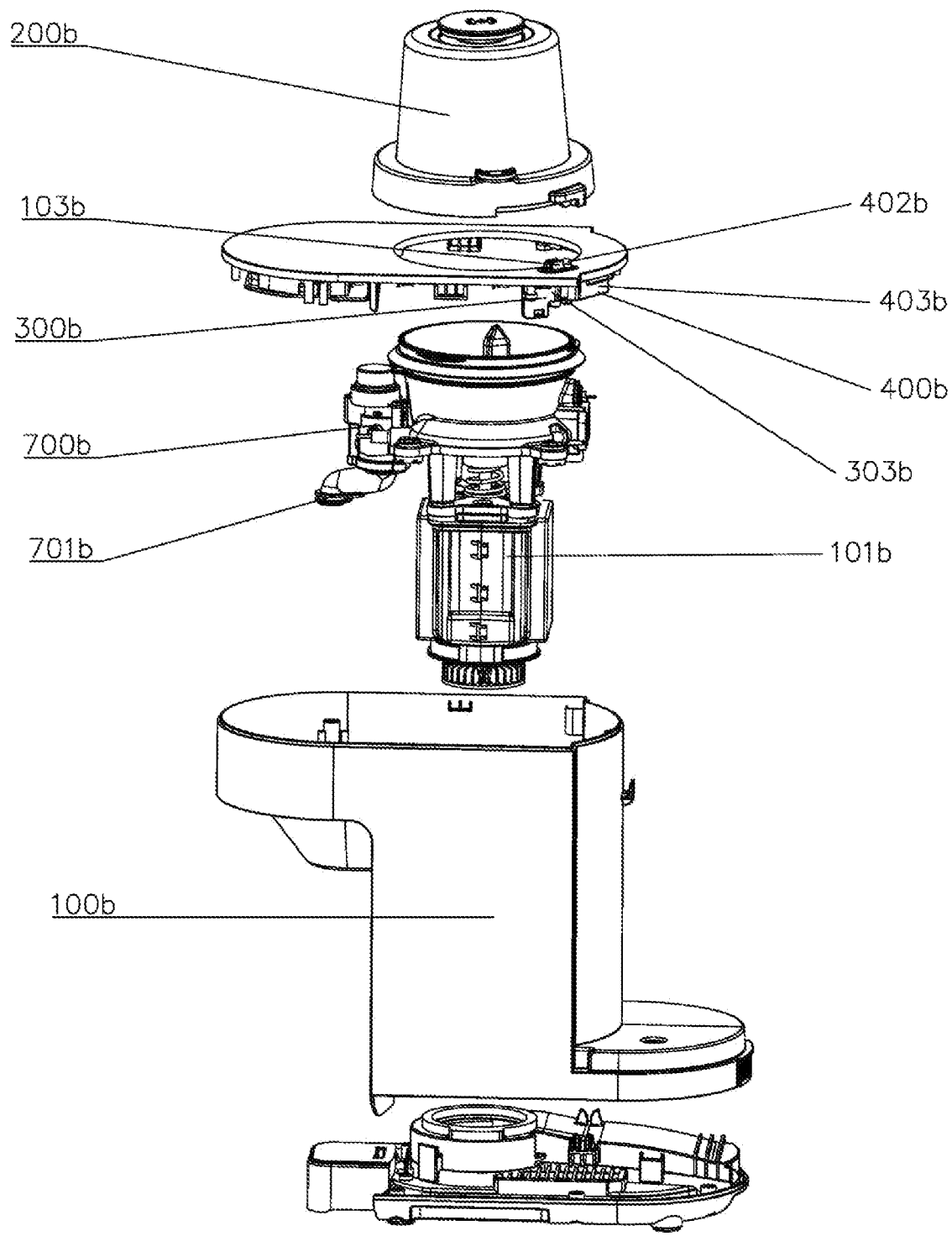
FIG. 10 is a schematic exploded view showing the structure of the whole machine of the food processor according to the another embodiment of the present application.
Figure 11:
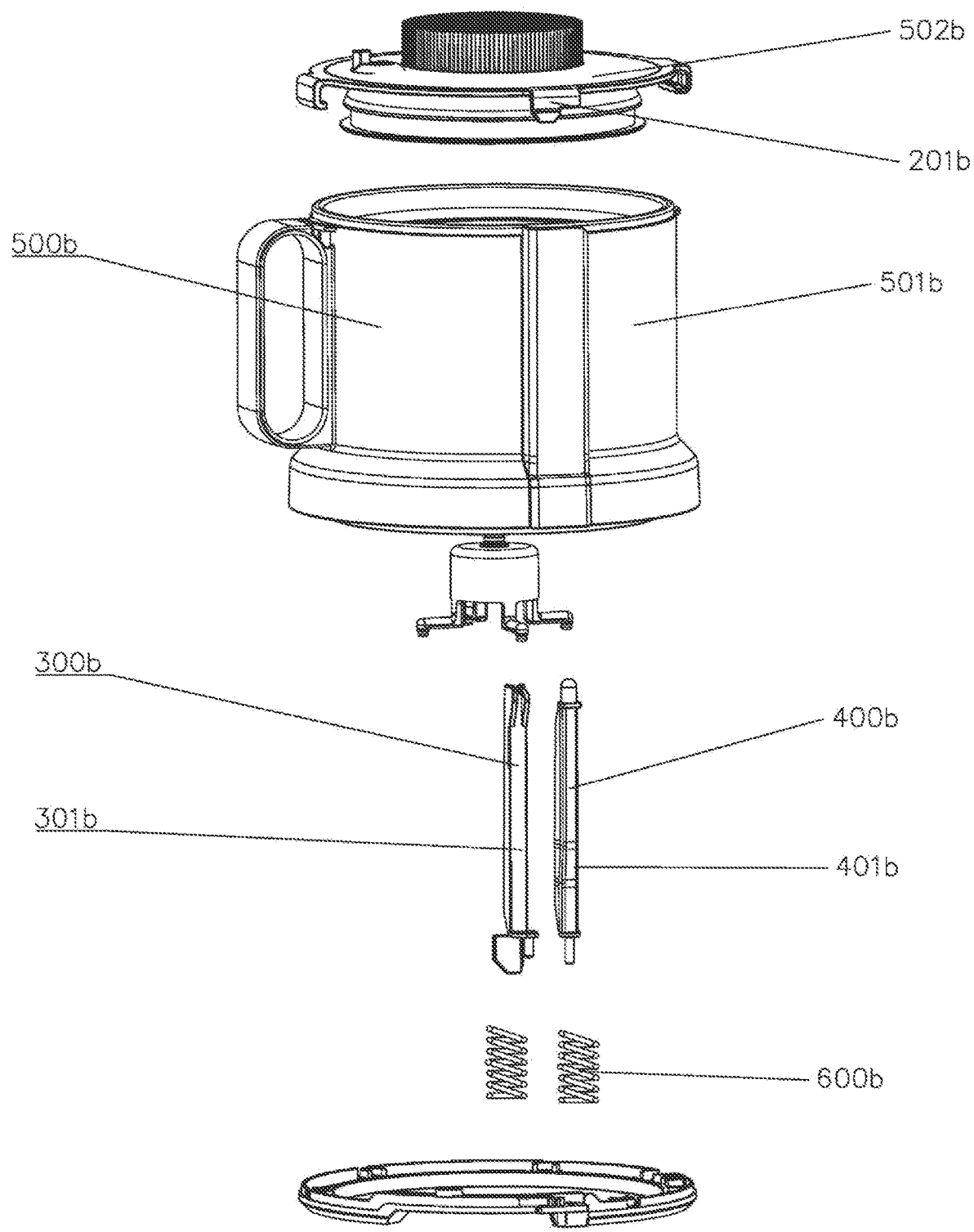
FIG. 11 is a schematic exploded view showing the structure of a cup assembly of the food processor according to the another embodiment of the present application.

As shown in FIG. 9 to FIG. 11, a food processor, which is safe to use, is provided according to this embodiment, including a main body 100b, a processing chamber part and an electric motor 101b. A bottom of the processing chamber part is provided with a liquid outlet and a valve assembly 700b arranged at the liquid outlet. The valve assembly is configured to open and close the liquid outlet, and the valve assembly is in communication with a water delivery pipeline of the water tank, so that water can be automatically added into the processing chamber part through the liquid outlet via the valve assembly, besides, the liquid outlet is controlled by the valve assembly to discharge the milklike liquid and wastewater of cleaning. Specifically, the valve assembly includes a valve housing, a valve core arranged in the valve housing, a valve sleeve sleeved outside the valve core, and a milklike liquid discharge pipe 701b, where the milklike liquid discharge pipe guides and discharges the milklike liquid or wastewater into a milklike liquid receiving jug or a residual water box. A crushing blade 104a, driven by the electric motor, is arranged in the processing chamber part. The processing chamber part includes a lower cavity portion 102b and an upper cavity portion 200b from bottom to top, where the upper cavity portion includes a glass cavity portion and a support bracket, the lower cavity portion is fixedly arranged on the main body, and the upper cavity portion is detachably installed at an upper port of the lower cavity portion. The food processor is provided with a safety linkage device 300b and a locking linkage device 400b, where the safety linkage device includes a safety switch 303b and a safety switch trigger 302b, and the locking linkage device includes a locking switch 403b and a locking trigger 402b. The locking linkage device is configured for locking the upper cavity portion, and after the upper cavity portion is installed in place, the safety linkage device is triggered to turn on the safety switch in the main body. A volume of the lower cavity portion is smaller than or equal to that of the upper cavity portion, so that the visual field of the upper cavity portion that can be observed by users is wider, the visual effects in processing and cleaning is good, and especially the visual effect that the processing chamber part is thoroughly cleaned is achieved.

In order to meet the requirements of multifunctional expansion of the food processor, a cup assembly with different functions is provided for replacement. Specifically, the main body is provided with the lower cavity portion 102b with the upper port, where the lower cavity portion is made of aluminum by die-casting and embedded with a heating tube, and the side wall of the lower cavity portion is provided with a spoiler rib. The lower cavity portion is of a conical shape with a larger upper part and a smaller lower part, and the crushing blade 104a is arranged in the lower cavity portion. The food processor is further provided with a multifunctional cup assembly 500b to serve as a substitute for the upper cavity portion. The cup assembly can be detachably connected with the main body or the lower cavity portion. Specifically, the upper cavity portion and the connecting section arranged at the upper cavity portion may be detached, and the multifunctional cup assembly 500b can be installed on the lower cavity portion or the main body. In this case, a processing chamber is defined by the multifunctional cup assembly 500b, that is, when the upper cavity portion is mounted on the lower cavity portion, the whole processing chamber is defined by the upper cavity portion and the lower cavity portion together. In the case that the multifunctional cup assembly 500b having a bottom wall and a cup lid substitutes for the upper cavity portion, the multifunctional cup assembly 500b can be stacked on the lower cavity portion to be assembled, and the processing chamber is defined by the multifunctional cup assembly 500b. As a basic functional component of the food processor in this embodiment, the detachable upper cavity portion includes a glass cavity portion with a lower port and a support bracket arranged at the lower port of the glass cavity portion, a top wall of the glass cavity portion is provided with a feeding port and a feeding lid, and the support bracket is provided with a mounting part 202b, through which the upper cavity portion is mounted on the upper port of the lower cavity portion. The upper cavity portion is provided with a lock-up trigger part 201b cooperating with the safety switch trigger 302b and the locking trigger 402b. Specifically, the support bracket includes an upper bracket and a lower bracket, where the mounting part is arranged at an inner side of the lower bracket, the lock-up trigger part is a protrusion arranged at a bottom of the lower bracket, and the protrusion is provided with a guide slope for guiding the assembly and disassembly of the upper cavity portion.

The cup assembly includes a cup body 501b with an upper port and a cup lid 502b which covers the upper port of the cup body. The cup body includes a plastic housing and a stainless steel cup arranged in the housing. The plastic housing includes an outer housing and a bottom lid, and the stainless steel cup may be an integrated structure including a bottom wall and a side wall. The cup assembly further includes a mounting part fitted with the upper port of the lower cavity portion, and the cup assembly is stacked on the lower cavity portion to be assembled. A multifunctional crushing blade is arranged in the cup body and is in transmission connection with the crushing blade arranged in the lower cavity portion. The locking trigger and the safety switch trigger cooperate with a locking connecting rod 401b and a safety connecting rod 301b respectively to perform linkage, triggering and locking, so that the cup body and the cup lid are locked on the main body at the same time before the food processor performs processing actions.

The safety linkage device includes the safety switch 303b and the safety switch trigger 302b. The upper cavity portion is mounted in place and drives the safety switch trigger to move so as to turn on the safety switch. The safety switch trigger at least partially protrude from the top of the main body, and the top of the main body is provided with a blocking member 103a, which is arranged at an outer periphery of an upper end of the safety switch trigger, to prevent the user from accidentally triggering the safety switch trigger and making the safety switch turned on accidentally. Specifically, in this embodiment, the blocking member includes two bosses arranged to protrude from an upper end face of the main body, and the safety switch trigger is arranged between the two bosses in a protruding manner. The locking linkage device includes a locking switch 403b and a locking trigger, where an upper end of the locking trigger is in a form of a hemispherical surface to optimize guiding and triggering, and the locking trigger at least partially protrude to lock the upper cavity portion. The upper cavity portion is provided with a guide structure cooperating with the safety linkage device and the locking linkage device.

In one solution, the guide structure includes a safety guide structure, which includes a first guide section 203b having a first guide slope and a trigger section 204b connected with the first guide section. Specifically, the upper cavity portion is provided with a protrusion, and the first guide slope of the guide structure is arranged on the protrusion. The safety switch trigger 302b and the locking trigger 402b are located on a same circumference in the circumferential direction, with this arrangement, the space can be saved in the radial direction, and the installation resistance can be reduced as much as possible, so that the lock-up trigger part can sequentially contact the locking trigger and the safety switch trigger along with the screwing of the upper cavity portion. A first elastic reset member is arranged between the safety switch trigger and the safety switch, and a second elastic reset member is arranged between the locking switch and the locking trigger.

A method for safely locking the cup lid of the food processor is provided in combination with the specific structure of the food processor according to this embodiment. The food processor includes a main body, an electric motor, an upper cavity portion, a lower cavity portion, and a cup assembly serving as a substitute for the upper cavity portion. The cup assembly is detachably connected with the main body or the lower cavity portion, the cup assembly includes a cup body and a cup lid, the safety linkage device 300b includes a safety connecting rod arranged on the cup body, and the locking linkage device 400b includes a locking connecting rod arranged on the cup body, and the cup lid is provided with a lock-up trigger part. The method includes a linkage step, in which the lock-up trigger part, when the cup lid is being screwed and mounted on the upper port of the cup body, moves along with the cup lid and drives the safety connecting rod and the locking connecting rod respectively to perform linkage. The lock-up trigger part moves along with the cup lid to form its movement path. The linkage step includes a first linkage step, in which the lock-up trigger part get into contact with the safety connecting rod to drive the safety connecting rod to be pressed down, and keep the safety connecting rod in a pressed-down state after the cup lid is mounted in place; and a second linkage step, in which the lock-up trigger part get into contact with the locking connecting rod to drive the locking connecting rod to move downward. During the screwing action of the cup lid, the lock-up trigger part acts on the safety connecting rod and the locking connecting rod respectively; and after the cup lid is mounted in place, the safety switch is in conduction, and the cup lid is locked by the locking linkage device. The installation of the cup lid can realize both the conduction of the safety switch and triggering of the locking action of the cup lid, and the structure is simple and the operation is smooth.

In the second linkage step, after the cup lid is mounted in place, the lock-up trigger part is misaligned with the locking connecting rod, so that the locking connecting rod can bounce back upward onto the movement path of the lock-up trigger part through the elastic reset member. When the locking connecting rod bounces back, the user is provided with the hand feel and sound prompt of whether the cup lid is mounted in place or not, to avoid the situation that the locking connecting rod does not bounce back in time and be clamped when the safety switch is in conduction, resulting in the situation that the user is still able to detach the cup assembly or the cup lid while the machine can be started up for operation.

The safety linkage device includes a safety switch arranged on the main body or the lower cavity portion. The method further includes a triggering step, in which the cup assembly is mounted on the main body or the lower cavity portion, so that the safety connecting rod kept in the pressed-down state triggers the safety switch to be in conduction. Preferably, the safety linkage device further includes a safety switch trigger arranged on the main body or the lower cavity portion, and in the triggering step, the cup assembly is mounted on the main body or the lower cavity portion, so that the safety connecting rod kept in the pressed-down state presses the safety switch trigger, thereby triggering the safety switch to be in conduction.

The locking linkage device further includes a locking trigger arranged in the main body or the lower cavity portion. The method further includes a locking step, in which the locking trigger abuts against the locking connecting rod and enables the locking connecting rod to lock the cup lid at the upper port of the cup body so as to prevent the cup lid from being detached. The performance of the trigger step enables the safety switch to be triggered only after the cup lid is mounted in place, thereby isolate the crushing blade in the cup assembly from the user, to provide the first safety barrier for the user. In the triggering step, the safety switch may be directly triggered by the safety connecting rod or indirectly triggered via the safety switch trigger, which not only ensures the performance reliability of the triggering step, but also saves effort in mounting the cup assembly on the main body or the lower chamber. In the locking step, the cup assembly is locked on the main body, which ensures that the user cannot touch the high-speed crushing blade either during or shortly after processing, thus forming a second safety barrier for effectively avoiding mechanical injury caused by disassembly during use, preventing milklike liquid splashing during the liquid making, and preventing high-temperature water splashing during automatic cleaning. At the same time, it is ensured that the two safety barriers do not mechanically interfere with each other, to avoid failure of either of them. The method further includes a processing step, in which the control module in the main body controls the food processor to perform corresponding processing actions based on the operation instruction input by the user, such as making soybean milk, rice porridge, fruit and vegetable juice or dry grinding.

In the locking step, the cup body is mounted on the main body through the mounting part, and the locking trigger drives the locking connecting rod to move upward, and keeps the locking connecting rod in a state that the locking connecting rod at least partially protrudes on the movement path of the lock-up trigger part.

In one solution, for the food processor without the locking switch, the locking trigger is fixedly arranged at the main body or the lower cavity portion. When the cup body is mounted on the main body, the first linkage step and the second linkage step are performed, and when the cup lid and the cup body are mounted on the main body or the lower cavity portion, the locking trigger will keep pushing up the locking connecting rod and maintain the locked state of the cup lid. In this case, the locking trigger is fixedly arranged at the main body or the lower cavity portion, and the user needs to mount the cup lid on the cup body first, to trigger the first linkage step and second linkage step, and then mount the cup assembly on the main body or the lower cavity portion to trigger the locking step, otherwise, if the locking step is triggered first, and the locking connecting rod protruding on the movement path of the lock-up trigger part will hinder the installation of the cup lid. Preferably, the locking connecting rod includes a first locking connecting rod and a second locking connecting rod, and an elastic reset member is arranged between the first locking connecting rod and the second locking connecting rod. In this case, in order to enable the user to experience more convenient assembly and disassembly, in the second linkage step, the lock-up trigger part gets into contact with the first locking connecting rod to drive the first locking connecting rod to move downward. In the second linkage step, the locking trigger drives the first locking connecting rod and the second locking connecting rod to move upward, to make the first locking connecting rod at least partially protrudes on the movement path of the lock-up trigger part of the cup lid. When the locking step is triggered, the first locking connecting rod and the second locking connecting rod are linked and pushed up, so that the first locking connecting rod protrudes on the movement path of the lock-up trigger part. Since the elastic reset member is arranged between the first locking connecting rod and the second locking connecting rod, even if the cup body is mounted on the main body first and the first locking connecting rod protrudes, the triggering step and the locking step are not performed at this time, because the cup lid is not mounted yet, the safety connecting rod is not pressed, that is, neither the first linkage step nor the second linkage step is performed. At this time, the cup lid is mounted, and the lock-up trigger part performs the first linkage step, and under the action of the elastic reset member, the lock-up trigger part can press the first locking connecting rod under the condition that the locking trigger keeps pushing up. At this time, the elastic reset member is compressed, and after the lock-up trigger part is misaligned with the first locking connecting rod and the cup lid is mounted in place, the first locking connecting rod bounces back upward, and an upper end of the first locking connecting rod is located at a rear side of the lock-up trigger part, to lock the cup lid to prevent the cup lid from being detached, which provides the user with greater freedom of operation and double safety protection.

In one solution, the locking linkage device includes a locking switch and a locking trigger arranged on the main body or the lower cavity portion. In the locking step, the cup body is mounted on the main body through the mounting part, and the locking switch drives the locking trigger to move upward to abut against a lower end of the locking connecting rod, so as to keep the state that the locking connecting rod least partially protrudes on the movement path of the lock-up trigger part. After the locking step is completed, the locking trigger protrudes to lock the cup lid, thus effectively preventing the cup body and the cup lid from being disassembled or mounted for a second time. The control module controls the food processor to perform the locking step in the specific process or program of the whole automatic processing and cleaning, thus the possible accidental operations of assembly and disassembly by the user are fully considered. In addition, when the locking trigger does not lock the processing chamber part, the processing action cannot be started, and the locking trigger can still be elastically pressed down, so as to avoid hindering the detaching of the cup body, and provide the user with the appropriate feel for the reverse operation such as detaching the cup body and the cup lid before performing the processing.

The locking step is performed after the triggering step, that is, the second safety barrier is built on the basis of the first safety barrier, thus providing sufficient operation space for the user. Before the second safety barrier is built, even if the safety switch is not triggered, the user can still detach the cup assembly to perform some reverse operations or additional operations, such as replace or add some solid ingredients, which fully considers the convenience of users' operation and humanistic operation experience. The locking step is performed before the whole machine starts the processing action, which optimizes users' experience while ensuring safety.

Further, the control module controls the locking step to be performed after the operation instruction is input and before the processing action is performed. In order to optimize automatic milklike liquid making, the food processor includes a water tank, a pump and a water delivery pipeline, so that the control module controls the water in the water tank to be automatically added into the processing chamber through the water delivery pipeline. The processing action of the food processor includes actions relating to milklike liquid making such as automatic water feeding, heating, crushing and the like. The control module controls the locking step to be performed after the operation instruction is input and before the processing action is performed, which not only provides users with time to continue adding or replenishing ingredients, but also provide users with time and freedom for the reverse operation for the second time, and until the processing action is right to be performed, the locking step really locks the cup assembly or the upper cavity portion, at this time, any actions of detaching the cup assembly or the upper cavity portion is not allowed, and even if the user accidentally operates to intend to open the processing chamber part, the accidental operation will be hindered by the locking linkage device. In this way, in addition to providing users with sufficient time for adding ingredients, it is avoided that users may accidentally press the operation instruction and need to further modify or correct the operation instruction, such as resetting the processing parameters or recipes and the like, and thus the fully automatic intelligent service of the food processor is optimized and upgraded.

Further, the method for safely locking the food processor further includes an unlocking step, in which the control module controls the locking linkage device to unlock the cup assembly or the upper cavity portion when a time interval "t" is passed after the processing action is finished, and the control module controls the locking switch to stop the continuous pushing on the locking trigger. Since the elastic reset member is arranged between the locking trigger and the locking switch, the locking switch is unlocked, and the locking trigger is still protruding upward under the action of the elastic reset member, and at this time, the locking trigger remains protruding on the disassembly path of the cup assembly or the upper cavity portion. However, when the user detaches the cup assembly or the upper cavity portion, the locking trigger is pressed down to release the hindering, so that the cup assembly or the upper cavity portion can be successfully detached, and the time interval "t" satisfies 1.5 s≤t≤10 s. In this embodiment, the processing action means that the food processor performs a complete processing program corresponding to the instruction input by the user. In this embodiment, "t" is set as 3 s. In the unlocking step, the control module controls the locking linkage device to perform unlocking in a delayed manner, so that for the processing chamber part of the self-cleaning food processor, the milklike liquid or cleaning water can be fully discharged, and the time for the crushing blade in the processing chamber part to slow down or stop is sufficient. After the unlocking step is completed, the user can easily detach the cup assembly or the upper cavity portion, thus avoiding being injured by the high-speed crushing blade. In a case that the instruction input by the user is to perform the dry grinding function, it can also prevent the powder from being sprayed out. In this embodiment, the locking switch is an electromagnet, and the locking trigger includes an electromagnet trigger connecting rod, and an elastic reset member is arranged between the electromagnet and the electromagnet trigger connecting rod.

The food processor has an appointment function. If the user needs to make an appointment for milklike liquid making, an appointment step is correspondingly included in the processing step, and the locking step is started after the appointment step is started. In this embodiment, further, the locking step is started after the appointment step is completed and before the processing action is started. During the appointment time set based on the instruction input by the user, the processing program has not been actually started, and the locking step has not been performed yet. During the countdown of the appointment time, the user can still detach the cup assembly or the upper cavity portion for adding ingredients and other operations, until the appointment time is reached before the processing action such as automatic water adding is required, the control module controls to perform the locking step to lock the cup assembly or the upper cavity portion, thus avoiding the mechanical injury caused by the user's accidental opening during the processing.

In one solution, the locking connecting rod and the safety connecting rod are arranged in sequence along a screwing direction of mounting the cup lid. The first linkage step is performed after the second linkage step. In this way, the relative distance between the locking connecting rod and the safety connecting rod in the circumferential direction can be minimized, thereby reducing the installation space of the connecting rod and ensuring that the first linkage step and the second linkage step do not interfere with each other. The first linkage step and the second linkage step are performed successively, in time and space, the lock-up trigger part gets into contact with the locking connecting rod and the safety connecting rod in sequence, and the contact action does not necessarily lead to triggering, which depends on the start and performance nodes of the trigger step and the locking step. By contact with the locking connecting rod and the safety connecting rod respectively, the user can be provided with a hand feeling prompt on whether the cup lid is in place. The sequential contact also reduces the installation resistance, and minimizes the radial size of the cup assembly, that is, the space for mounting the locking connecting rod, the safety connecting rod and the corresponding elastic reset member.

It can be understood that, as a solution of another guide structure according to this embodiment, the lock-up trigger part includes a protrusion, and the guide structure includes a locking guide structure, which includes a locking groove 206b and a second guide section 205b arranged in the locking groove. The second guide section is provided with a second guide slope which is connected with an open end of the locking groove.

It can be understood that the safety switch trigger is arranged to be radially aligned with the locking trigger.

It can be understood that in the case that the processing chamber part is defined by the upper cavity portion and the lower cavity portion being assembled, the upper cavity portion is screwed and mounted to the lower cavity portion through the mounting part, and the lock-up trigger part can get into contact with the locking trigger and the safety switch trigger at the same time; alternatively, the upper cavity portion is screwed and mounted to the lower cavity portion through the mounting part, and the lock-up trigger part first gets into contact with the safety switch trigger and triggers the safety switch, and then gets into contact with the locking trigger.

It can be understood that in a case that the upper cavity portion is substituted by the cup assembly 500b, the locking connecting rod and the safety connecting rod are arranged in sequence along the screwing direction of mounting the cup lid. The first linkage step is performed before the second linkage step.

Alternatively, the locking connecting rod and the safety connecting rod are arranged along a radial direction of the cup body, and the first linkage step and the second linkage step are simultaneously performed. When the locking connecting rod and the safety connecting rod are arranged along the radial direction, the relative angular velocity is the same, and the cup lid can get into contact with both of them at the same time when being screwed, thus avoiding the situation that one of them is not contacted or the locking connecting rod does not bounce back smoothly after contact, which leads to the failure of the subsequent locking step.

It can be understood that the method for locking the cup lid according to the present application is applicable to self-cleaning food processors, and is also applicable to conventional common food processors that need manual water and ingredients feeding, manual milklike liquid pouring and manual cleaning.

It can be understood that an elastic reset member 600b for resetting the safety linkage device and/or the locking linkage device is provided on the main body and/or the cup body.

It can be understood that multiple cup body assemblies may be provided for substitution according to needs, for example, for cold or hot processing, dry grinding, meat mincing, vegetable shredding, etc.

In addition to the above preferred embodiments, the technical solutions protected by the present application are not limited, and it should be noted that the combination of multiple technical solutions in any one of the embodiments and the combination of technical solutions in any one of the embodiments with technical solutions in one or more other embodiments is within the scope of protection of the present application. Although the present application has been described in detail above with general descriptions and specific embodiments, some modifications or improvements can be made on the basis of the present application, which is apparent to those skilled in the art. Therefore, all those modifications and improvements made without departing from the principle of the present application fall within the scope of the present application.

The invention claimed is:

1. A self-cleaning food processor, comprising:
a main body, a processing chamber part and an electric motor;
a crushing blade driven by the electric motor;
a valve assembly in communication with a water delivery pipeline configured to add water into the processing chamber part; wherein
the processing chamber part includes an upper cavity portion, a lower cavity portion, and a connecting section located between the upper cavity portion and the lower cavity portion; and wherein
the crushing blade is arranged inside the lower cavity portion, the lower cavity portion is fixedly arranged at the main body, the upper cavity portion is detachably connected to the lower cavity portion, the connecting section is connected to the upper cavity portion, and the connecting section at least partially protrudes toward an interior of the processing chamber part relative to the lower cavity portion; and
a cup assembly configured to serve as a substitute for only the upper cavity portion, wherein
the cup assembly is detachably connected to the main body or the lower cavity portion, and the cup assembly includes a cup body and a cup lid mounted to an upper port of the cup body;
the food processor further comprises a safety linkage device, and the cup lid is provided with a lock-up trigger part, which is configured to get into contact with a safety connecting rod of the safety linkage device to drive the safety connecting rod to be pressed down, and keep the safety connecting rod in a pressed-down state after the cup lid is mounted in place.

2. The food processor according to claim 1, wherein the connecting section comprises an annular seal, the seal forms a part of an inner side wall of the processing chamber part; an annular bottom lid is arranged at a lower port of the upper cavity portion, and the seal is mounted on the bottom lid.

3. The food processor according to claim 1, wherein
an inner side wall of the upper cavity portion is inclined, and an inner side wall of the connecting section is inclined in the same direction as an inner side wall of the upper cavity portion; or
an inner side wall of the connecting section is vertically arranged; or
an inner side wall of the lower cavity portion is inclined, and an inner side wall of the connecting section is inclined in the same direction as the inner side wall of the lower cavity portion.

4. The food processor according to claim 1, wherein a top end of the crushing blade is arranged to be not higher than the connecting section, the connecting section is fixedly arranged at the lower port of the upper cavity portion, and a step is formed at a joint between the connecting section and the lower cavity portion.

5. The food processor according to claim 2, wherein an annular support bracket is arranged at the lower port of the upper cavity portion, and the bottom lid is fixedly connected with the support bracket, and the seal is at least partially clamped and fixed between the lower port of the upper cavity portion and the bottom lid.

6. The food processor according to claim 1, wherein the seal is provided with an opening and an elastic deformation space in communication with the opening, and an upper port of the lower cavity portion at least partially abuts against the seal to compress the elastic deformation space.

7. The food processor according to claim 1, wherein a sum of a volume of the upper cavity portion and a volume of the connecting section is greater than or equal to a volume of the lower cavity portion.

8. The food processor according to claim 1, further comprising
a locking linkage device, wherein the lock-up trigger part of the cup lid is configured to get into contact with a locking connecting rod of the locking linkage device to drive the locking connecting rod to move downward.

9. The food processor according to claim 8, wherein the lock-up trigger part is configured to misalign with the locking connecting rod after the cup lid is mounted in place, to allow the locking connecting rod to be bounced back upward onto a movement path of the lock-up trigger part through an elastic reset member.

10. The food processor according to claim 8, wherein the locking linkage device further comprises a locking trigger, the locking trigger is configured to abut against the locking connecting rod and make the locking connecting rod lock the cup lid at the upper port of the cup body, to prevent the cup lid form being detached.

11. The food processor according to claim 10, wherein the locking linkage device further comprises a locking switch, when the cup body is mounted to the main body or the lower cavity portion, the locking trigger is configured to drive the locking trigger to move upward and abut against a lower end of the locking connecting rod, to keep the locking connecting rod in a state that the locking connecting rod is at least partially protrudes on a movement path of the lock-up trigger part.

12. The food processor according to claim 10, wherein the safety linkage device comprises a safety switch, and when the cup assembly is mounted to the main body or the lower cavity portion, the safety connecting rod which is kept in the pressed-down state is configured to trigger the safety switch to be in conduction.

13. The food processor according to claim 8, wherein
the locking connecting rod comprises a first locking connecting rod and a second locking connecting rod, and an elastic reset member is arranged between the first locking connecting rod and the second locking connecting rod;
the lock-up trigger part is configured to get into contact with the first locking connecting rod and drive the first locking connecting rod to move downward;
the locking trigger is configured to drive the first locking connecting rod and the second locking connecting rod to move upward, to make the first locking connecting rod at least partially protrude on a movement path of the lock-up trigger part of the cup lid.

14. The food processor according to claim 12, wherein the safety linkage device further includes a safety switch trigger, and when the cup assembly is mounted on the main body or the lower cavity portion, the safety connecting rod which is kept in the pressed-down state is configured to press down the safety switch trigger, to trigger the safety switch to be in conduction.

15. A food processor, comprising:
a main body, a processing chamber part and an electric motor;
a crushing blade driven by the electric motor; wherein
the processing chamber part includes an upper cavity portion, a lower cavity portion, and a connecting section located between the upper cavity portion and the lower cavity portion; and wherein
the crushing blade is arranged inside the lower cavity portion, the lower cavity portion is fixedly arranged at the main body, the upper cavity portion is detachably connected to the lower cavity portion, the connecting section is connected to the upper cavity portion, and the connecting section at least partially protrudes toward an interior of the processing chamber part relative to the lower cavity portion; and
a cup assembly configured to serve as a substitute for only the upper cavity portion, wherein
the cup assembly is detachably connected to the main body or the lower cavity portion, and the cup assembly includes a cup body and a cup lid mounted to an upper port of the cup body;
the food processor further comprises a safety linkage device, and the cup lid is provided with a lock-up trigger part, which is configured to get into contact with a safety connecting rod of the safety linkage device to drive the safety connecting rod to be pressed down, and keep the safety connecting rod in a pressed-down state after the cup lid is mounted in place.

* * * * *